June 1, 1954 G. C. BELTMAN ET AL 2,679,809

CAR RETARDER FOR RAILROADS

Filed March 23, 1949 8 Sheets-Sheet 1

INVENTORS.
George C. Beltman
Donald H. Sweet
BY Donald H. Sweet
Atty.

June 1, 1954 G. C. BELTMAN ET AL 2,679,809

CAR RETARDER FOR RAILROADS

Filed March 23, 1949 8 Sheets-Sheet 2

INVENTORS.
George C. Beltman
Donald H. Sweet
BY Donald H. Sweet
Atty.

June 1, 1954 G. C. BELTMAN ET AL 2,679,809

CAR RETARDER FOR RAILROADS

Filed March 23, 1949 8 Sheets-Sheet 3

INVENTORS.
George C. Beltman
Donald H. Sweet
BY
Donald H. Sweet
Atty.

June 1, 1954 G. C. BELTMAN ET AL 2,679,809

CAR RETARDER FOR RAILROADS

Filed March 23, 1949 8 Sheets-Sheet 4

INVENTORS.
George C. Beltman
Donald H. Sweet
BY Donald H. Sweet
Atty.

June 1, 1954 G. C. BELTMAN ET AL 2,679,809

CAR RETARDER FOR RAILROADS

Filed March 23, 1949 8 Sheets-Sheet 5

INVENTORS.
George C. Beltman
BY Donald H. Sweet
Donald H. Sweet
Atty.

CAR RETARDER FOR RAILROADS

Filed March 23, 1949

INVENTORS.
George C. Beltman
Donald H. Sweet
BY Donald H. Sweet
Att'y.

June 1, 1954 G. C. BELTMAN ET AL 2,679,809

CAR RETARDER FOR RAILROADS

Filed March 23, 1949 8 Sheets-Sheet 7

INVENTORS
George C. Beltman
Donald H. Sweet
BY Donald H. Sweet Atty

INVENTORS.
George C. Beltman
Donald H. Sweet
BY
Donald H. Sweet Atty.

Patented June 1, 1954 2,679,809

UNITED STATES PATENT OFFICE 2,679,809

CAR RETARDER FOR RAILROADS

George C. Beltman, Chicago, and Donald H. Sweet, Evanston, Ill.; said Sweet assignor to said Beltman Application March 23, 1949, Serial No. 83,018

30 Claims. (Cl. 104—26)

This invention relates to railroad operation and includes among its objects and advantages an improved system for operating freight marshalling yards in railroads and an improved automatic retarding unit controlled and operated by the car to be retarded.

In the accompanying drawings.

For decades it has been common to reduce the speed of such cars by friction against the sides of the wheels near the outer periphery, and to employ selective manually controlled means for applying varying degrees of friction. Such apparatus requires the constant attention of an operator whose expert judgment of the speed and weight of each car is critical in determining the success of the operation. On this account it is customary and practically indispensable to let one or several operators make several successive guesses by providing several successive retarders to act on each car, so that if the first retarder does too much or too little, the error in judgement can be corrected in a subsequent operation. Many elaborate attempts have been made to do such retarding automatically, but automatic operation has been outside the practical art.

The retarding unit disclosed is both automatically controlled and completely actuated by the oncoming car as a combined function of the weight and speed, entirely independent of any human intervention.

*The friction unit*

Figure 1:
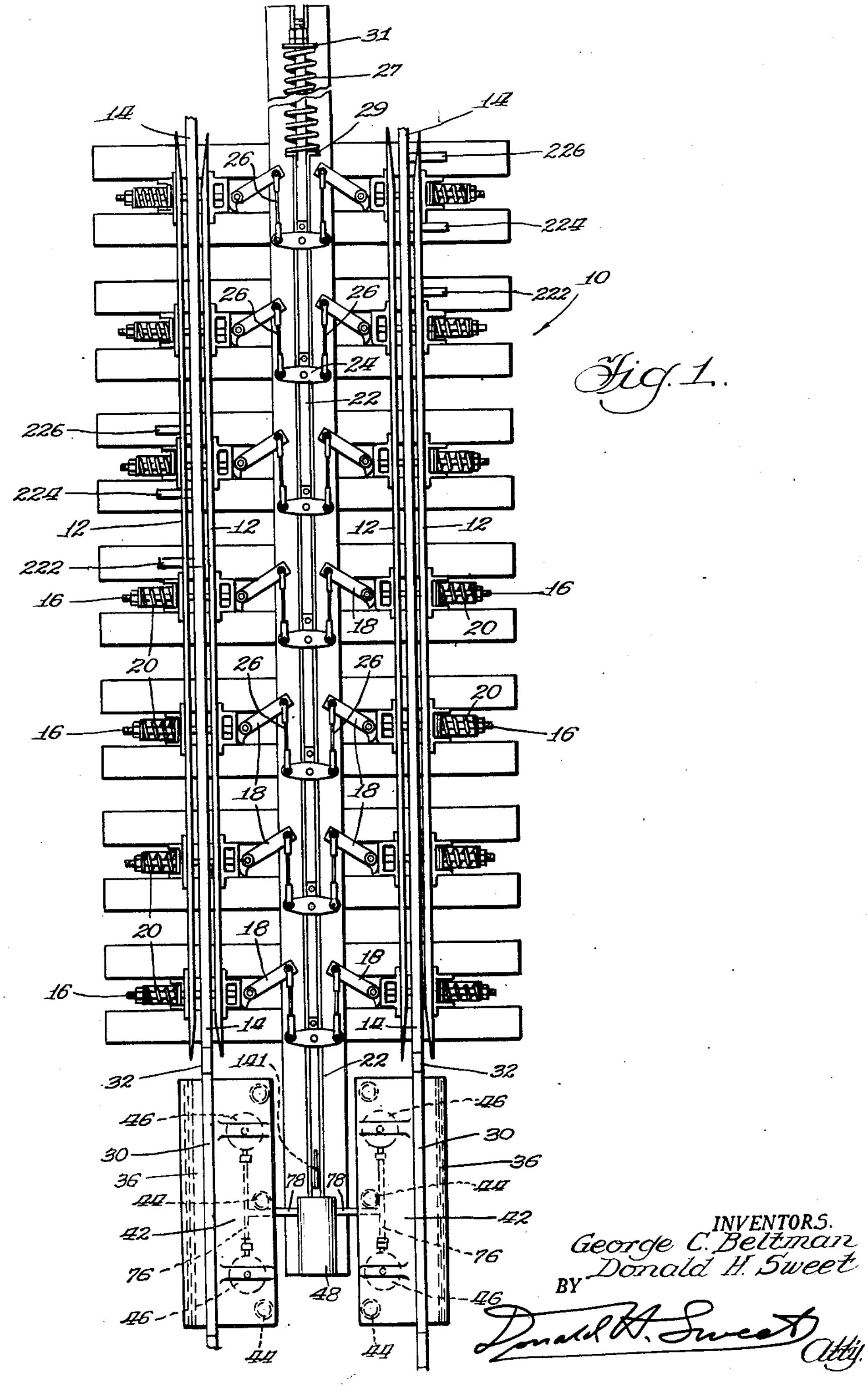
Figure 1 is a plan view of a suitable friction unit.
Figure 2:
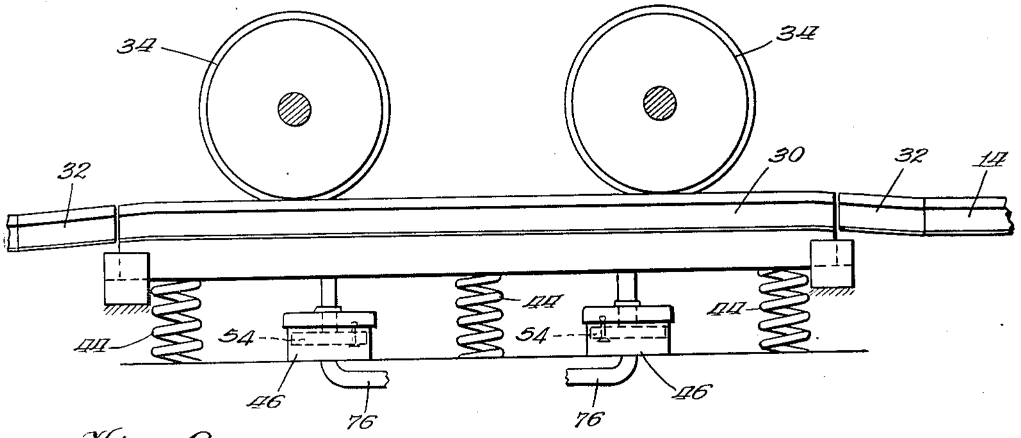
Figure 2 is a partially diagrammatic side elevation of a weighing treadle.

In the embodiment of the invention selected for illustration, and referring first to Figures 1 and 2, the retarder proper, indicated as a whole by the reference character 10, may be that disclosed in the co-pending application of George C. Beltman, Serial Number 633,690, filed December 8, 1945, now Patent Number 2,499,812. Briefly, it comprises pairs of flexible friction shoes 12, one adjacent each of the rails 14, which friction shoes may be pressed together by means of tension bolts 16 actuated by cam levers 18 which shorten the bolts so that the entering wheels will compress the springs 20. All the cam levers 18 are operated in unison from a longitudinal draw bar 22, as by means of yokes 24 and tension cables 26. In the position shown in Figure 1, the retarder stands open, that is, the shoes 12 can move far enough apart to exert practically no friction on car wheels passing between them, without any compression of the springs 20. Movement of the draw bar 22 about 13 inches downward will rock all the cam levers 18 through a maximum of nearly 90° and shorten all the bolts 16 so that when the wheels come between the shoes a maximum rubbing action will be exerted to retard the cars. When not in action, the parts are held in retracted and inoperative position by a return spring 27 operating in compression between a fixed abutment 29 and the retaining plate 31 on the end of the draw bar 22.

*Actuation and control*

To control and actuate the friction unit of Figure 1, we employ as a power source liquid under pressure, utilizing energy derived from the car to be controlled. Thus in Figure 2 we have indicated a treadle, or weighing beam, 30 designed to be pushed down by the weight of a truck passing over it through a distance of an inch, more or less. The treadle 30 may be conventionally connected to adjacent rail portions by short articulated sections indicated at 32 in Figure 2. The treadle 30 is made long enough so that both wheels 34 of the truck of the railroad car will remain on it while the car travels at least a foot or two.

Each beam 30 carries an outer flange 36 (see Figure 3) constituting a short lever arm, and having a rounded fulcrum 38 running the entire length of the beam and resting on a fixed support 40. An inner flange 42 extends in about twice as far as the flange 36 extends out. This flange is supported along its remote edge at five points. Compression springs 44 are located adjacent each end and at the middle point. Midway of the spaces between the springs 44 we provide two supply cylinders 46. From the supply cylinders, when the wheels of a truck are on the beam 30, hydraulic pressure fluid, such as oil, flows to the longitudinally acting operating cylinder 48 which is mechanically connected to the draw bar 22. When the beam 30 is not loaded, the parts are kept in the position indicated in the drawings by spring means including the compression spring 27 at the remote end of the draw bar 22 and a compression spring 52 (see Figure 5) under the piston 54 in each of the supply cylinders 46.

Figure 8:
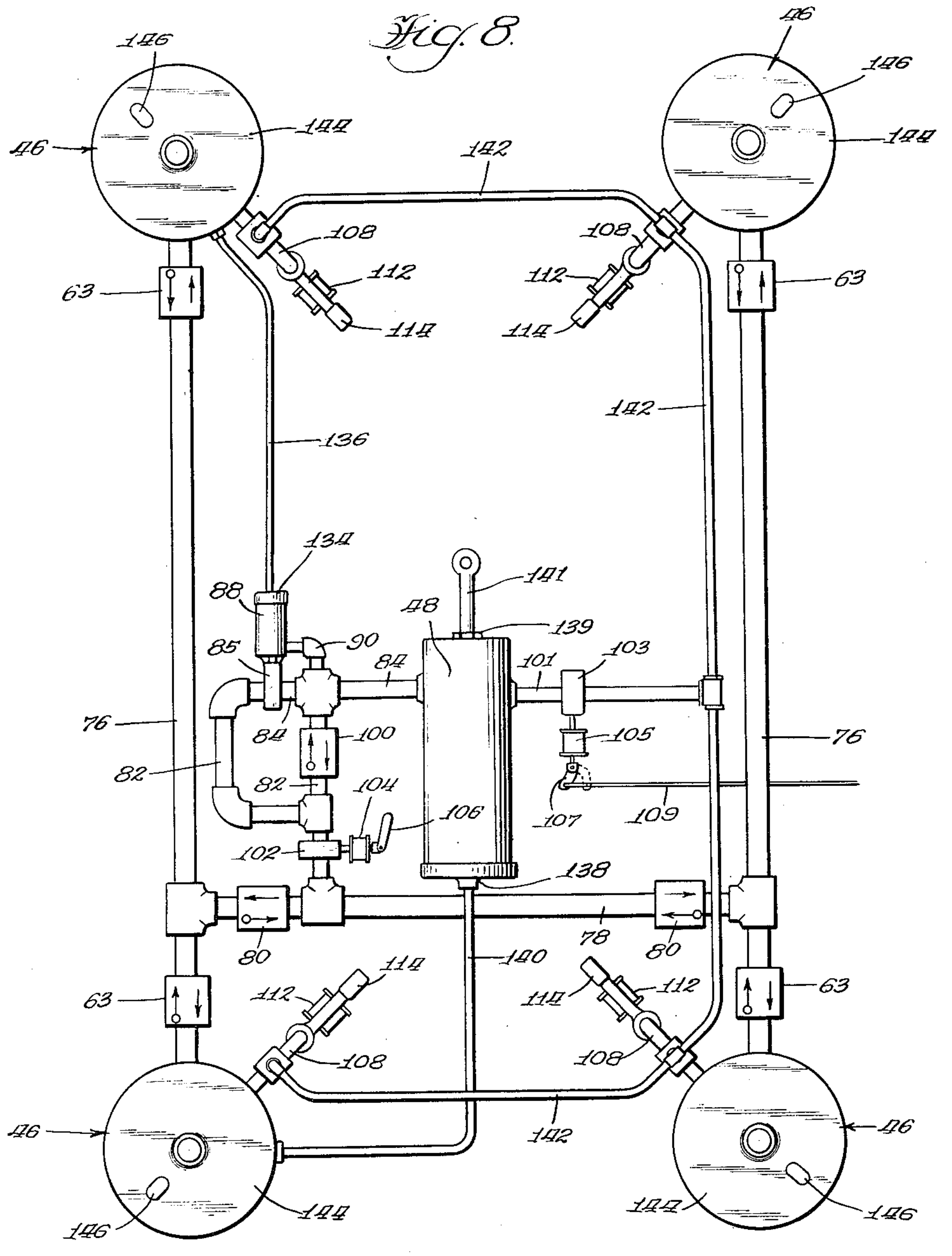
Figure 8 is a plan view of a complete control and operating unit of maximum range and adaptability.
Figure 11:
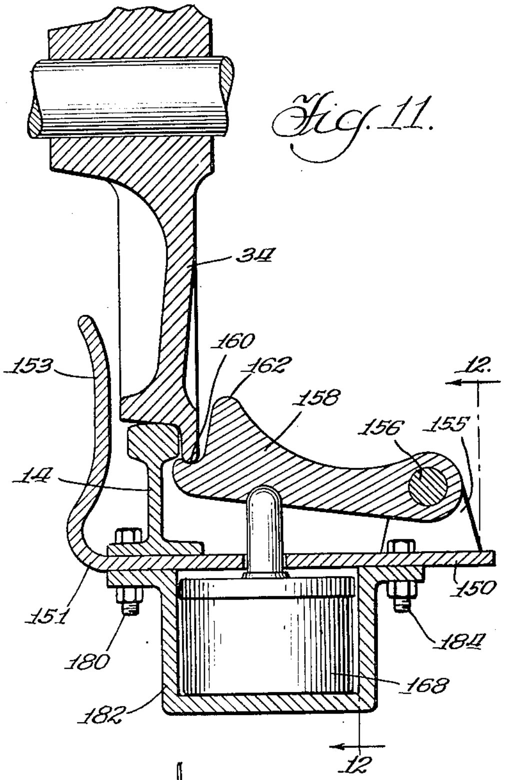
Figure 11 is a transverse section on line 11—11 of Figure 12 indicating a treadle adapted to be acted on by only one wheel at a time.
Figure 12:
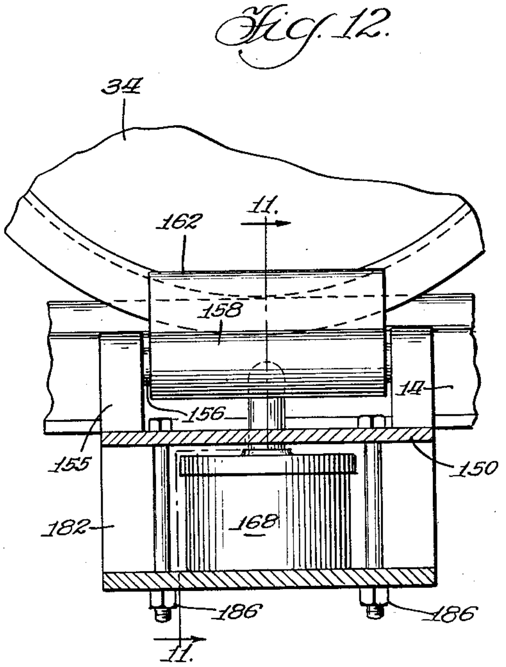
Figure 12 is a section on line 12—12 of Figure 11.

Referring now to Figure 8, we have indicated four power cylinders 46 positioned to be actuated by two treadles positioned beside each other in the rails so that the entire weight of one truck of the car is available for operation and control. Each supply cylinder 46 is provided with an adjustably throttled by-pass from the bottom of the cylinder around to the top. Thus (see Figure 5) the bottom outlet 60 is connected to a valve body 62 housing a needle valve 64 to vary the effective area of the opening 66 and the escaping pressure fluid is returned on top of the piston through the pipe 68. It will be apparent that the pressure generated in each power cylinder 46 will be a function of the speed with which the piston 54 moves down and that that speed will depend in part on the weight of the truck and in part on the speed with which the truck gets onto the treadle.

During the descent of the treadle under the weight of either a light or heavy car moving rapidly, a major fraction of the weight of the truck is carried dynamically by the power cylinders 46 because the liquid cannot get out fast enough, and thus the effective weight of the truck is available through a vertical distance of about an inch to supply the necessary power. However, even a heavy car weighing, say, 80 tons, traveling as slowly as one mile an hour will move onto the treadle so slowly that the by-pass throttle 64 will let the fluid under the cylinder get around on top of the cylinder without at any time generating enough pressure under the cylinder to operate anything. The same car at a speed of ten miles an hour will get onto the treadle so quickly and push the pistons down so fast that 90 per cent or more of the available energy will be delivered by the pistons to the operating mechanism because the fluid cannot escape fast enough through the throttle 64 to dissipate more than five or ten per cent. Similarly, a light car at 10 miles an hour will give nearly all its energy to the treadle with the same effectiveness as the heavy car, but because the light car will generate a much lower peak pressure, the amount of oil forced into the operating cylinder before the truck gets off the treadle is correspondingly less. The springs 44 are of sufficient strength to carry only about half the weight of a light car, when fully compressed. Therefore if a heavy car weighs four times as much as a light car, the springs will store and return about one-fourth of the energy represented by vertical displacement of the light car through the working stroke but only about one-sixteenth of the corresponding energy of the heavy car, and the remainder will be available to actuate the friction unit of Figure 1, except for the leakage loss through valves 64.

Figures 4, 7:
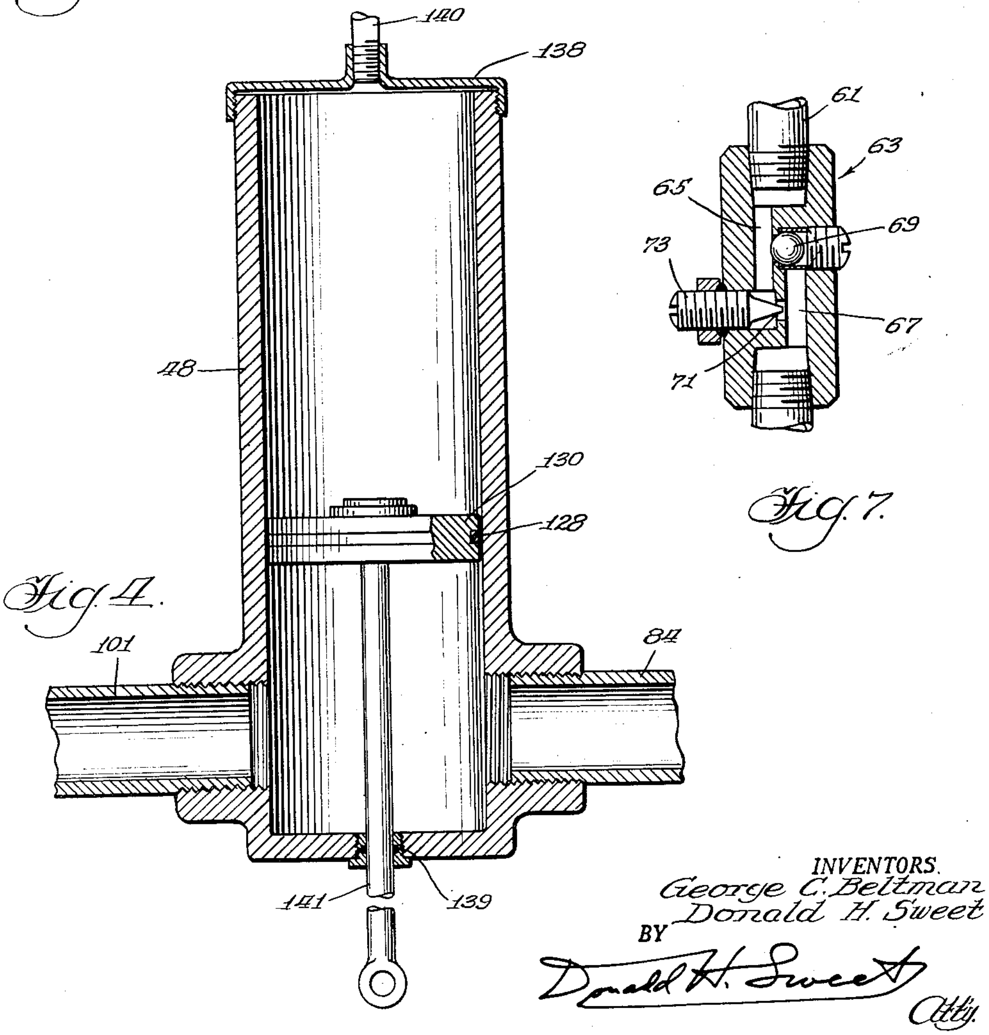
Figure 4 is a section of an operating cylinder for setting the unit of Figure 1.
Figure 7 is a section of a two-way valve operating as a check valve in one direction and as a throttling valve in the other direction.

Referring now to Figure 8, from each of the four power cylinders 46 pressure fluid is taken during the pressure wave produced by the depression of the treadle, and the total supply from all four cylinders is merged to operate the operating cylinder 48. From each pressure cylinder the fluid is delivered in the first instance through a combined check valve and throttling valve 63 illustrated in detail in Figure 7, which valve, per se, forms no part of our invention.

Briefly, the pressure fluid enters at 61 and passes from the internal passage 65 to the parallel passage 67 through two cross connections including a ball check valve 69 and a throttle opening 71 adjustably constricted by the tapered point of the screw 73. In Figure 8 the direction of action of each of the control valves 63 is indicated by two arrows. The arrow with the ball at the base points in the direction in which the liquid flows freely through both passages. When the pressure difference is the other way, the ball valve closes and the line arrow indicates the direction in which the flow will be through the throttled orifice only and may be retarded to delay the action to any desired extent. It will be noted that all the control valves of Figure 8 permit rapid flow into the operating cylinder 48 and retard the flow out of it. Along each side the discharge from the cylinders 46 is merged in longitudinal pipes 76 and the flow through both pipes 76 is again merged in a cross pipe 78 with an additional two-way check and throttling valve 80 at each end of the pipe 78. From the pipe 78 the pressure fluid passes through a longitudinal pipe 82 and a transverse pipe 84 into the cylinder 48.

This channel 84 is subjected to three different controls. The first control is by the gate valve 85 indicated in detail in Figure 6. After the cylinder 48 has operated to set the friction unit of Figure 1 the entry of the wheels of the truck between the shoes 12 will compress the springs 20 and exert a powerful force that will increase the pressure in the cylinder 48 to from five to ten times the pressure that is already in the cylinder to move the draw bar 22 against the restoring force of the return spring 27.

The operating cylinder 88 for the gate valve 85 is connected to pipe 84 where it enters the cylinder 48 by a branch pipe 90, and this rise in pressure will move the piston 92 against the force of a spring 94 and move the gate 96 to shift the opening 98 out of alignment with the pipe 84, thus effectively closing the pipe 84 and, to that extent, locking the piston in the cylinder 48 and the entire friction unit of Figure 1 in fixed position so long as the high pressure continues. The spring 94 is set with an initial tension materially greater than is needed to resist the force of the spring 27, but several times less than could withstand the pressure generated in the cylinder 48 when the friction unit is loaded.

This locking action would be complete except for the combined check and throttling valve 100 which is connected to the pipe 82 at points on opposite sides of the gate valve 85 and thus operates as a by-pass for the gate valve. The throttle of the valve 100 is set to permit the escape of fluid very slowly indeed so that during the passage of the front and rear trucks of the car which first closed the gate valve 85, the setting of the friction unit may gradually decrease by from 10 to 30 per cent. The third control in the pipe 84 is another gate valve 102 for use only when it is desired to render the entire operating unit inoperative for emergency or special reasons. The gate valve 102 is normally wide open but may be closed either by a solenoid 104 or a hand lever 106. Closure of the gate valve 102 cuts off the operating cylinder 48 permanently from all the power cylinders so that the friction unit will remain inactive and cars can be run over the section of track involved without being retarded.

Figure 3:
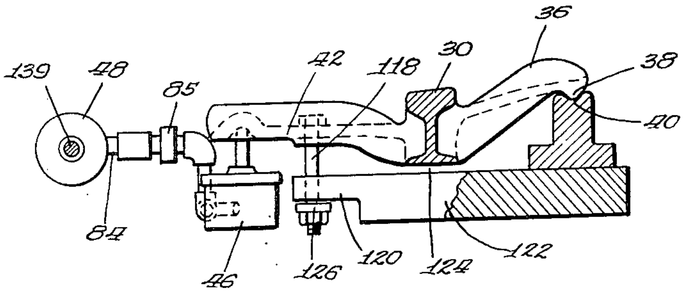
Figure 3 is an end view of one of the weighing treadles.

Taking the retarding unit out of operation by means of the gate valve 102 will compel the power cylinders to carry the weight of the cars passing over them. While they are fully capable of doing this, in case the shut down is for an extended period, it is desirable to relieve them of such unnecessary loads. For this purpose each power cylinder may be provided with a by-pass 108 controlled by a gate valve 110 (see Figure 5) which may be a duplicate of the gate valve 102 except that it is normally in closed position and may be moved to open position by the solenoid 112 or the operating handle 114. Opening this large by-pass in each power cylinder will permit the oil in that cylinder to circulate around the piston without generating high pressures and get back down through the piston the same way and also through one or more simple check valves 116. For more extended shut downs a simpler and more permanent means is indicated in Figure 3. The treadle 30 carries a plurality of tension bolts 118 passing through a shelf 120 on the base plate 122. When a particular unit is to be left inoperative for days or weeks, it is a simple matter to run a car onto the treadles and push the treadles down into abutment with the base 122 at the bottom contact 124. Then an operator can reach under and insert a thick U-shaped washer between the washer 126 and the shelf 120. This locks the treadles down substantially flush with the rails 14 so that traffic can function over the treadles substantially as if they were not there.

*Leakage*

Figures 5, 6:
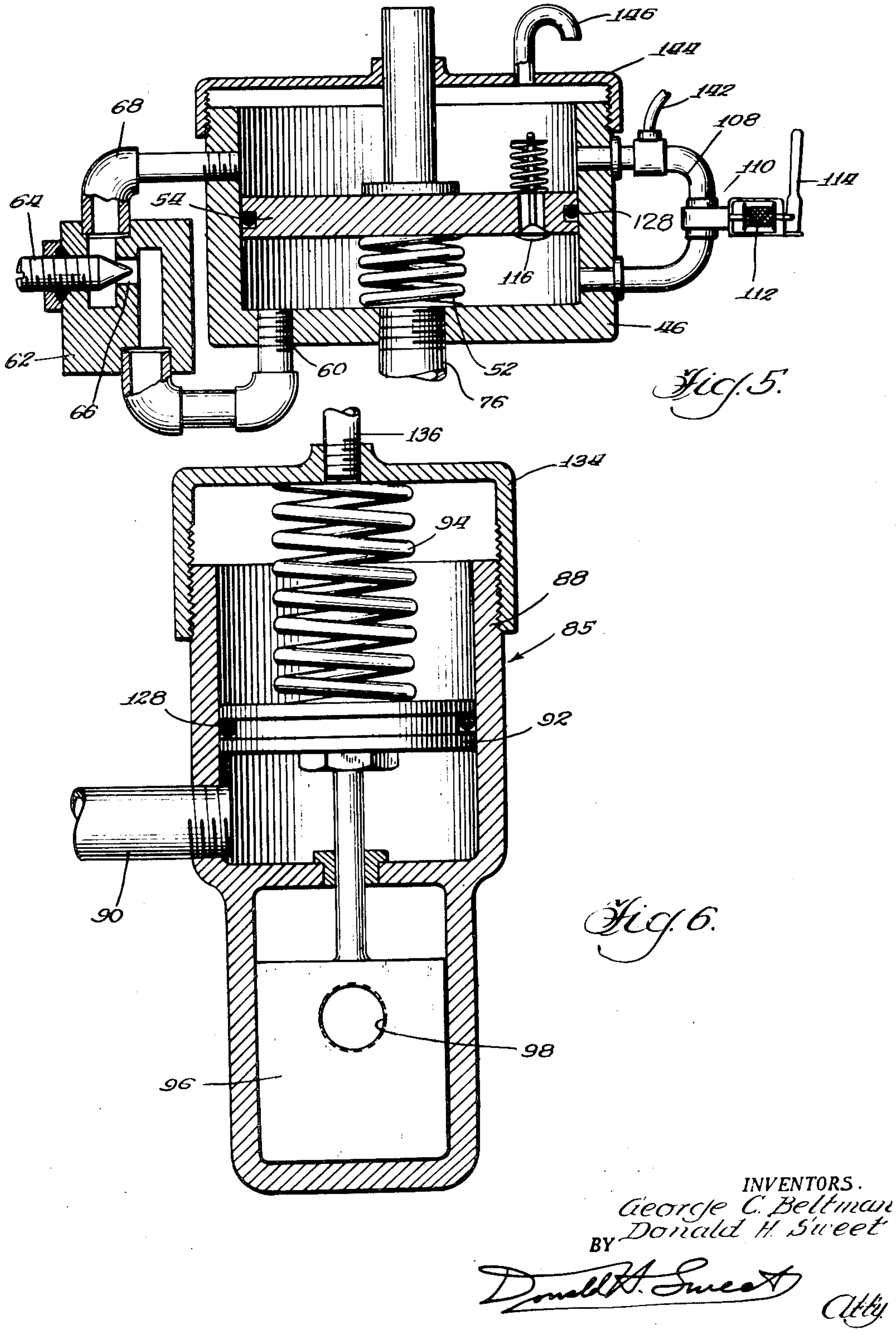
Figure 5 is a section of one of the power cylinders to be operated by the treadle of Figure 2.
Figure 6 is a section of a gate cut-out valve.

The high pressures generated in the power cylinders 46, if they cause leakage at all, merely cause leakage back to the other side of the submerged pistons 54. We have indicated a conventional O-ring packing at 128, but it is perfectly feasible to use pistons 54 with no packing at all and let them leak a little. But the piston 92 operates with low pressure on one side of it and any leakage will be cumulative and the same applies to the piston 130 in the operating cylinder 48. Accordingly we provide pistons 92 and 130 with good packing 128 and also means to accumulate and return any pressure fluid that works past these pistons. In Figure 6 the operating cylinder 88 is provided with a sealing cap 134 connected by a relatively tiny return pipe 136 to the nearest power cylinder 46 so that leakage can work back a few drops at a time into the system. Similarly, the cylinder 48 has a cap 138 and a return pipe 140 also running to the nearest power cylinder. The packing gland 139 for the shaft 141 could be similarly equipped. To insure effectively against the risk of any accumulation of the pressure fluid in one of the power cylinders 46 to the point of spilling over, we locate all four cylinders at the same level and interconnect them above the pistons 54 with equalizing pipes 142 so that any excess accumulating in one of the power cylinders can flow back by gravity to the other cylinders. To render this action gentle and certain each of the power cylinders is merely covered by means of a cover 144, which is protection from dirt and has an open air vent 146.

*Operation*

The complete and universal control indicated in Figure 8 is capable of automatic handling of any situation that may arise and operates as follows: Because there are four power cylinders the full weight of a truck can generate enough energy to move the operating piston 130 to increase the friction even when a truck is passing through the friction unit. The valves 63 are the primary setting-up control and they are all given substantially identical settings such that a car coming in below a certain predetermined minimum speed, such as one or one and a half miles an hour, will not move the pistons 54 down fast enough to generate enough pressure below the pistons to overcome the spring 27 and set up the friction unit at all. Conversely, the same car traveling ten miles an hour will get onto the treadles so quickly that for a substantial period of time the full weight of the truck will be effective in pressure below the pistons 54 and an amount of pressure fluid varying according to the weight of the car will be forced into the operating cylinder.

After the first truck has passed over the treadle and entered the shoes, if the amount of friction automatically determined is extremely slight or none at all, the cylinder 48 will not develop enough pressure to cut itself off by means of the gate valve 85. But whenever a material amount of friction is developed, this cut-off will occur as soon as the truck enters the friction unit. This reduces the slow return movement of the operating cylinder to the predetermined speed secured by adjusting the throttle valve 100, which is set for a rate of return flow only about 10 or 15% of that permitted through the combined return valves 63. Thus the setting secured by the first truck, whenever the car is traveling fast enough to need material retarding, will remain effective in substantially unimpaired amount until the first truck gets out of the friction unit. However, if the rear truck of the same car gets on the treadle while the front truck is still in the friction unit, and because the wheels happen to be slippery or for some other reason the car is still traveling so fast that it needs more retardation than it is getting, the impact of the following truck can refill the operating cylinder 48 through wide open channels and increase the setting of the friction unit enough to do a little extra work on the first truck. And because the piston 130, at such a moment, is already part way up the cylinder, the following truck has that material advantage over what it would otherwise have, and can give itself materially higher friction setting than it would if it encountered the unit with a zero setting.

If a heavy car is sent through with a light car coupled behind it, the heavy car will get the friction it ought to have and the front truck of the light car may get a little more friction than it would get if it went through alone, but the throttle valve 100 will let the unit relieve itself a little during passage of the front truck of the light car, and if the retardation already accomplished has brought the unit down to critical speed the rear truck of the light car will get no friction at all.

In some cases, where the leading car is very heavy and the following car very light and the speed high, it may happen that the friction unit will be set so tight that the wheels of the front truck of the following car will be forced up out of the friction shoes. As explained in Patent 2,499,812, previously identified, this does no injury to the wheels or the friction unit because he friction unit is so designed that the wheels can roll along on the upper edges of the friction shoes and be deposited smoothly and accurately back on the rails. In cases where the loading condition is such that the front truck of the following car is lifted out of the shoes, the rear truck of the following car, by the time it reaches the treadle, will be able to give itself a substantially correct amount of friction while it passes through, and a slightly greater friction value because it will get onto the treadle about the time the rear truck of the heavy car gets out of the friction unit, and, if the speed is still too high, set itself up a little higher because the unit was partially set up when it got on the treadle. As soon as the friction unit is empty the pressure drops enough to let the gate valve 85 open, and the entire unit returns to open condition in about two seconds or so, under the control of valves 63.

The return flow throttling valves 80 are included primarily as a safety factor only. They are normally adjusted with their throttling valves fairly wide open so that the valves 63 are substantially the sole determinant of the return movement. But if any one of the four valves 63 should be defective and fail to throttle adequately, the corresponding valve 80 can be set up in a few seconds to give a fair approximation to the combined throttling action of the two valves with which it is in series.

*Simplified arrangements*

Figures 9, 10:
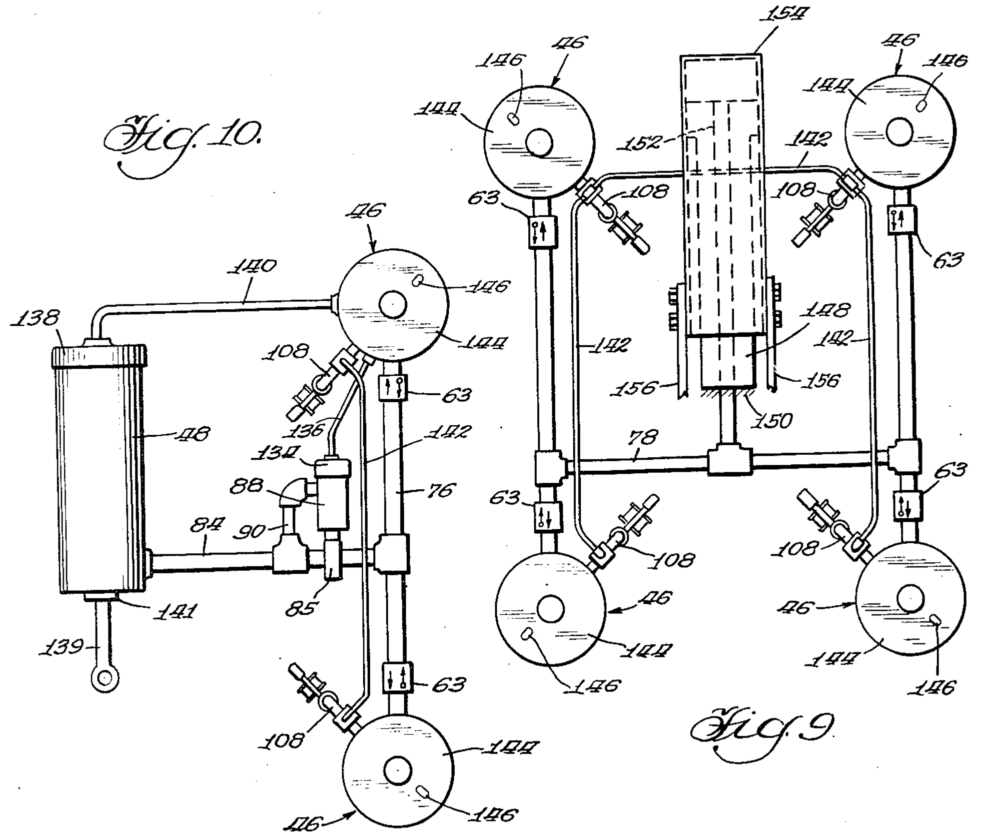
Figure 9 is a similar plan view of a simpler control and operating unit.
Figure 10 is a plan view of a unit for precise control and operation on single cars only.

In many yards where the volume of operations is not large and the conditions of operation not extreme, the simplified arrangement of Figure 9 will be found adequate. The power cylinders 46 and throttling valves 63 are as in Figure 8. But the cross pipe 78 stands open at all times and there is no other hydraulic control than the valves 63. In this figure we have also indicated a modified operating cylinder consisting of a ram 148 resting against a fixed abutment indicated at 150 and having a through bore 152. The operating cylinder becomes a cap 154 with a closed end which may be connected to the draw bar 22 by parallel yoke members 156. When operating conditions are not extreme, such a unit will give a close enough approximation to the operation of the unit of Figure 8 to secure satisfactory service.

The unit indicated in Figure 10 is not only much simpler than that of Figure 8 but it can do substantially as good a job, provided the yard is operated so that only one car at a time passes through the unit. In such a unit only two power cylinders 46 are provided, and the available power is not enough to enable a following truck to increase the setting of the operating cylinder 48 materially while the leading truck is still in the friction unit. However, the gate valve 85 and cylinder 88 are provided with no by pass so that an accurate setting is secured from the leading truck and held unchanged, at least until the leading truck passes. Usually the following truck will get onto the treadle before the leading truck leaves, in which case the gate valve 85 will never open until the following truck also has passed through the unit, but if the front truck happens to get out before the rear truck gets on the treadle, then the rear truck can make its own setting.

*Abnormal speeds*

In picturing the functioning of such a unit it is necessary to bear in mind that the desired amount of frictional force is not a linear function of the speed of the entering car, but varies substantially as the square of that speed. Thus, employing the kinetic energy of one ton moving one mile an hour for arithmetical convenience, assume that the desideratum is to handle cars up to ten miles an hour and to deliver all of them at a speed not materially exceeding two miles per hour. Under such circumstances the delivered cars will have four energy units per ton but an incoming car at four miles per hour will carry 16 energy units and needs to have 12 dissipated in friction. Similarly, a car coming in at eight miles per hour will have 64 units and need 60 removed by friction, and a ten mile car will have 100 units and need to lose 96. Accordingly, the friction unit needs to have a force capacity sufficient to absorb 7,680 units from an 80-ton car coming at ten miles per hour, to deliver that car at two miles an hour. The foregoing range of capacities is well within practical operation, but when such a unit is out in service there is always a possibility of accidents, and it is desirable that a runaway car coming in at 30 miles an hour should at least not be likely to wreak any additional damage because of the presence of the unit.

Fortunately, the inherent characteristics of the operation of the unit secure this result. For instance, with a treadle 30 ten feet long, a car coming in at 15 feet per second, which is roughly ten miles per hour, will have each axle on the treadle for $^{10}/_{15}$ of a second and both axles on the treadle for $^{4}/_{15}$ of a second. If it is an 80-ton car, there will be quite a little displacement of the piston 130 before the second wheel gets on and while both wheels are on the movement will be quite rapid. The viscosity of the fluid in the system can readily be made such that within the $^{16}/_{15}$ of a second during which the front truck of such a car has one or both axles carried on the treadle, the parts can accomplish at least 90% of the movement that they would finally achieve if the same effective pressure were continued for an indefinite period of time. But if the same car came in at 30 miles per hour and the time were reduced to 1/3, the effective movement would be reduced to 1/3 or a little bit less than 1/3. Accordingly the shoes of such a unit as we have disclosed would take a relatively light bite against the wheels of the runaway car, insufficient to cause any serious fusion at the point of friction contact, and insufficient to injure the retarding unit. In this connection, it is noted that it would be futile to attempt to stop such a car with such a retarding unit. If the unit did set itself up to its maximum capacity it could only take out about 96 units per ton, and the 30 mile per hour car would still leave at a speed of better than 28 miles an hour and do substantially the same amount of damage later on unless recaptured in some other way. Accordingly the failure of the retarder to respond fully to the demands of the runaway car merely protects the retarder itself from unnecessary additional damage. On cars slightly in excess of the maximum for which the unit is designed, the unit will still come close to doing the maximum retarding of which it is capable.

*Cut-out during action*

In a complete hump yard the height of the hump needs to be enough for handling all cars, even during winter weather when snow on the rails and cold bearings on the cars make those friction losses a maximum, and the movement of the car is sluggish. With such an installation, operation during maximum summer temperatures is with a material excess of available energy of descent and a correspondingly increased load on the retarder system. To take care of this variation fully we prefer to provide one or two retarding units about half-way down the hump, which units are completely or substantialy out of action in cold weather. Then at least these summer overload retarding units are provided with operator-controlled cut-outs effective to release the shoes quickly, even while the wheels of a car are in the shoes. Referring to Figure 8, we have indicated a relief pipe 101 opening out of the high pressure end of cylinder 48 and connected to any convenient return pipe, such as the equalizer pipe 142, to return the pressure fluid to the power cylinders. The gate valve 103 is provided with an operating solenoid 105 by means of which an operator in an observation tower can open the valve. We also provide a hand lever 107 and a rod 109 extending laterally out to some convenient point so that an operator at the spot can open the gate valve without crawling between the rails to get at it. It will be obvious that opening the valve 103, either by the solenoid 105 or the hand lever 107 will immediately permit the cylinder 48 to empty itself and the shoes will open at once.

The particular advantage of such a control is that when the weather is hot and the cars roll very freely, it is desirable to bring the cars almost completely to a standstill when they are about half-way down the hump and thus reduce the load on the final retarders that deliver the cars to the storage tracks.

Because the condition of the car wheels introduces a substantial variation in the effectiveness of the friction, it is advantageous to set these overload retarders to operate at values that will give sufficient retardation to cars with slippery wheels, even though the result is that cars with wheels that are not slippery may be completely stopped and held by the automatic action of the retarders. Whenever this happens or is about to happen, either the tower operator or an attendant on the spot can open the shoes quickly and let the stalled car start on down in time to permit the retarder unit to adjust itself for proper handling of the next car. Without such manual release, such a high setting for the automatic operation could not be safely employed because the stalled car would subsequently be hit by the next car coming down from the hump, and both cars would be seriously damaged and the operation of the yard interrupted.

*High and low pressure system*

Figure 13:
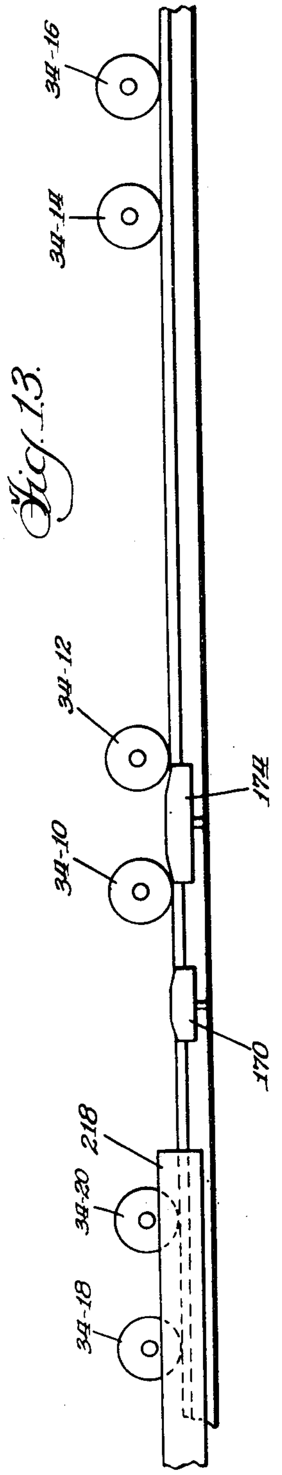
Figure 13 is a diagram indicating the longitudinal spacing of the parts with respect to the wheels of the cars.
Figure 14:
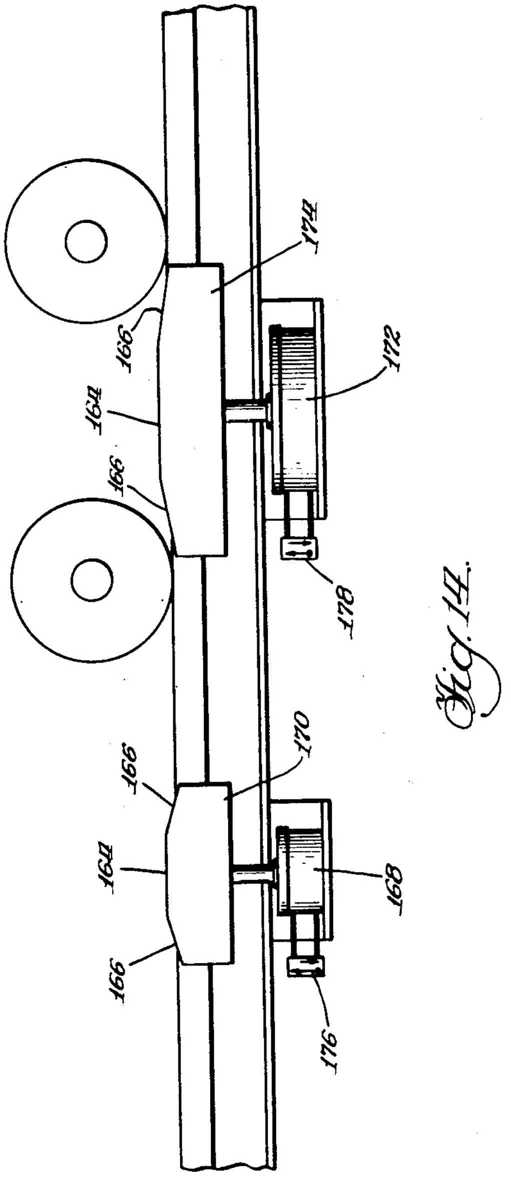
Figure 14 is an enlargement of part of Figure 13.

Referring now to Figures 11 to 14 inclusive, we have indicated a chair 151 underlying the rail 15 and carrying a guard 153 projecting up outside the rail to prevent the wheel 34 from getting out of line outwardly. At the inner end of the chair, spaced standards 155 support the pivot shaft 156 for the treadle 158. The treadle extends over adjacent the rail 14 and its edge is provided with a groove 160 backed up by a rising horn 162 (see Figures 11 and 12). The contour of the bottom of the groove is best indicated in Figure 14 and includes a central tread 164 about an inch above the surface of the rail 14 when not depressed and about an inch below the same surface in the position of Figure 11. Inclined end portions 166 slope down to provide gradual entry and exit for the wheel. Longitudinally centered with respect to the treadle 164 we position an operating cylinder 168 for the short shoe 170 of Figure 14 and a cylinder 172 of larger diameter under the long shoe 174 of Figure 14. Both cylinders may be identical with that of Figure 5 except that the return connection at 62 includes the ball check valve of Figure 7, as diagrammatically indicated at 176 for the cylinder 168 and 178 for the cylinder 172.

Each cylinder is made fast to its chair and rail by conventional connections such as bolts 180 passing through the rail flange and the chair and the hanger 182; inside corner bolts 184 passing through the hanger 182 and chair 150 only; and side tension bolts 186 set close beside the cylinder.

Figure 15:
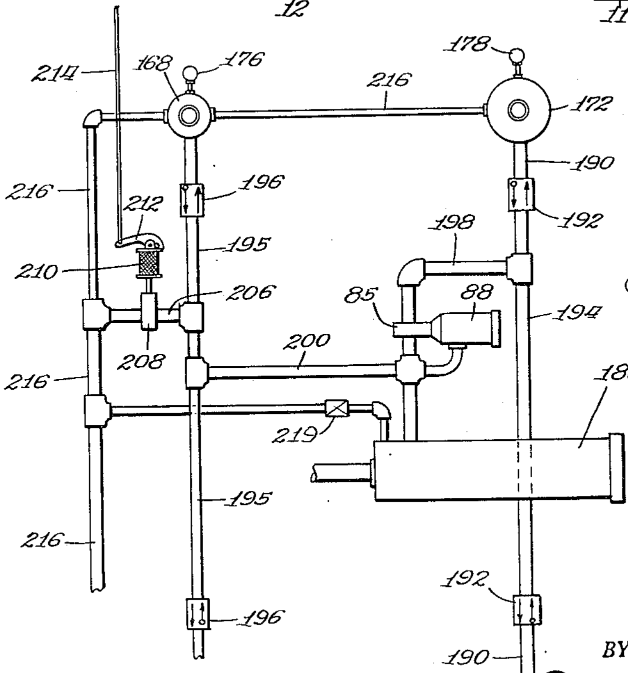
Figure 15 is a plan view of the piping for the embodiment of Figures 11 to 15 inclusive.

Referring now to Figure 15, the cylinder 168 has about one-third or one-quarter of the area of cylinder 172, and the operating cylinder 188 has a working volume such that the discharge from two cylinders 172 abreast of each other along opposite rails, plus the discharge from two cylinders 168, will move it through a full stroke when the speed and weight of the oncoming car is such that the power cylinders deliver a maximum.

It will be noted that the working pressures necessary to set up the empty friction unit are in a lower pressure range than those necessary to increase the setting when the friction unit is loaded. Thus, under ordinary conditions, the cylinder 188 will move the empty friction unit to a maximum setting without developing working pressures in excess of about 300 or 350 pounds per square inch, while the working pressure in the same cylinder to increase the setting of the loaded unit will be a minimum of about 600 or 700 pounds per square inch and may go as high as 2,000 pounds per square inch or more.

The hydraulic connections for such a unit are of the same general character as in Figure 8. In Figure 15 we have indicated a supply pipe 190 from each power cylinder 172 leading through a combined check and throttle valve 192 to the transverse low-pressure header 194. The high-pressure power cylinders 168 are also connected to a transverse high-pressure header 195 through throttle and check valves 196. From the transverse headers 194 and 195 pipes 198 and 200 lead directly to the operating cylinder 188. The normal low-pressure return is through the same pipes subject to the joint control of all four valves 192 and 196. But the pressure cut-out valve 85 of Figure 6 actuated by the cylinder 88, is inserted in pipe 198. Finally, the manual cut-out relief pipe 206, corresponding to pipe 101 of Figure 8, may be opened by opening valve 208 with the solenoid 210 or the operating lever 212 and pull rod 214, and when this is done, the cylinder 188 empties immediately into equalizer pipe 216 and cannot be effectively filled for operating purposes as long as the valve 208 remains open.

In Figure 15 we have indicated the complete control connections, but only one low-pressure cylinder 172 and one high-pressure cylinder 168. It will be understood that these are in duplicate on opposite sides of the track. The equalizer pipe 216 corresponds to the pipe 142 of Figure 8 and it and the transverse headers 194 and 195 extend across to the duplicate parts on the other side.

Referring now more particularly to Figures 13 and 14, we have indicated a wheel 34-10, constituting the foremost wheel of a car, as having just left the long low-pressure treadle 174 while the wheel 34-12 on the rear axle of the same truck is about to engage the same low-pressure treadle. In Figure 13 we have indicated also wheels 34-14 and 34-16 in the approximate position occupied by the rear truck of the same car. The friction unit is indicated in Figure 13 at 218 and is 27 feet long. If the car associated with wheels already referred to is the only car involved, it will be apparent that before the friction unit 218 is entered, both low-pressure treadles 174 will have been pushed down twice by wheels 34-10 and 34-12, and the high-pressure treadles 170 will have been pushed down by wheels 34-10 and will be pushed down again by wheels 34-12 when the wheels 34-10 are newly entered in the friction unit. At this time the cut-out valve 85 will close and the system will be locked against all but an extremely slow return movement.

The front truck now passes on through the friction unit. Before it leaves the friction unit, the wheels of the rear truck will pass over the high-pressure treadles 170, and the pressure wave developed at that time will be a function of the speed of the car. If the front wheels are slippery, or for any reason the car is still going faster than it should, the high-pressure treadles will develop enough pressure to increase the setting of the friction unit materially in two successive increments so that the rear truck will be gripped at least as strongly as the front truck was or even a little more so. On the other hand, if the condition of the rubbing surface secures maximum friction, the speed will already have been reduced to a point where the pressure wave in the high pressure cylinders will not be high enough to reset the friction unit and the rear truck will go through the unit subject to a little less friction than the front truck.

Similarly, if the car already discussed was coupled to and preceded by another car, the rear truck of which is indicated in Figure 13 by the wheels 34—18 and 34—20, the setting of the friction unit when the wheels are in the position of Figure 13 will be that set up in the first instance by the front truck of the front car. That setting will be modified by wheels 34—18 and 34—20, depending to a minor extent on the weight of the front car and to a major extent on the amount of retardation that has already been accomplished on both cars. Ordinarily wheels 34—18 and 34—20 will be gripped a little tigher than those on the front truck of the leading car, but as the speed of the two cars is progressively reduced, the setting of the friction unit will be allowed to get lower and lower because the wheels passing over the high pressure treadles 170 move too slowly to increase the setting. Thus a fairly long string of coupled cars can be allowed to pass through, and until the speed of the entire string has been reduced to a point where the high-pressure treadles 170 do not generate enough pressure to reset the friction unit, full friction will be applied to every wheel that comes along.

For such operation, the return throttles of the low-pressure valves 192, are set so that under the low pressures obtaining when the friction unit is unoccupied, the friction unit will be returned to zero setting in two or three seconds, ready for the next car to come along. The high-pressure return throttles 196, however, are set so that under the high pressure of the loaded friction unit, the unit can return only about 20% of its stroke in about four seconds. The high-pressure cylinders will increase the setting about 6% every time an axle passes over them at maximum safe speed.

Thus when a group of coupled cars comes along, the setting will be kept at or near maximum until the speed gets so low that the throttled return in valves 176 prevents the high-pressure cylinders from building up enough pressure to replace the leakage through valves 196 during the intervals between actuations. In heavy duty service, a small overload relief valve 219 set to open at about 6000 pounds per square inch and return excess pressure fluid to the equalizer pipe 216, permits adjustment of valves 196 for slightly higher values than would otherwise be safe.

It will be obvious that the control units of Figures 8, 9 and 10 are adapted to operate most conventional friction units as well as the flexible shoe unit disclosed. But with the conventional units which cannot be depended on to replace a wheel that rides over the friction shoes, the maximum friction has to be set lower and throttle 100 left wider open. This means that the very heavy cars get quite a little less than optimum retardation.

The precise sensitivity of the high pressure cylinder to various speeds can be tailored to suit operating conditions by varying the contour of the treadle 170, but because the area of the cylinder 168 is substantially insufficient to lift the wheels of a car, the response secured depends on speed only. Similarly, the treadle 174 may have its contour varied to secure desired operating characteristics. But the cylinder 172 has enough area to lift the wheels of a car momentarily, and therefore the response depends on both weight and speed.

*Low speed release*

It will be obvious that if a car stalls or comes completely to rest, while in the retarder unit, the slow leakage through valve 100 of Figure 8 will reduce the fluid pressure until valve 85 opens, and thereafter the more rapid leakage through valves 80 and 63 will accelerate the drop to a pressure so low that the spring 27 will open the retarder unit. And in Figure 15 the same action occurs with slow leakage through valves 196 and rapid leakage through valves 192. However, such a sequence with parts adjusted for most effective action, might take ten or fifteen seconds, and on the more steeply inclined position of a hump, a delay of such length might slow down the operation or result in collisions or both.

On sections where the slope is steep enough so that a stalled car will start up again if the retarder friction is removed, we provide an additional quick-acting release control. This makes it possible to adjust retarders so equipped, for such high friction values that an occasional car is stalled, and still avoid any undesirable results when a stall occurs. This can be done mechanically or electrically.

Figure 16:
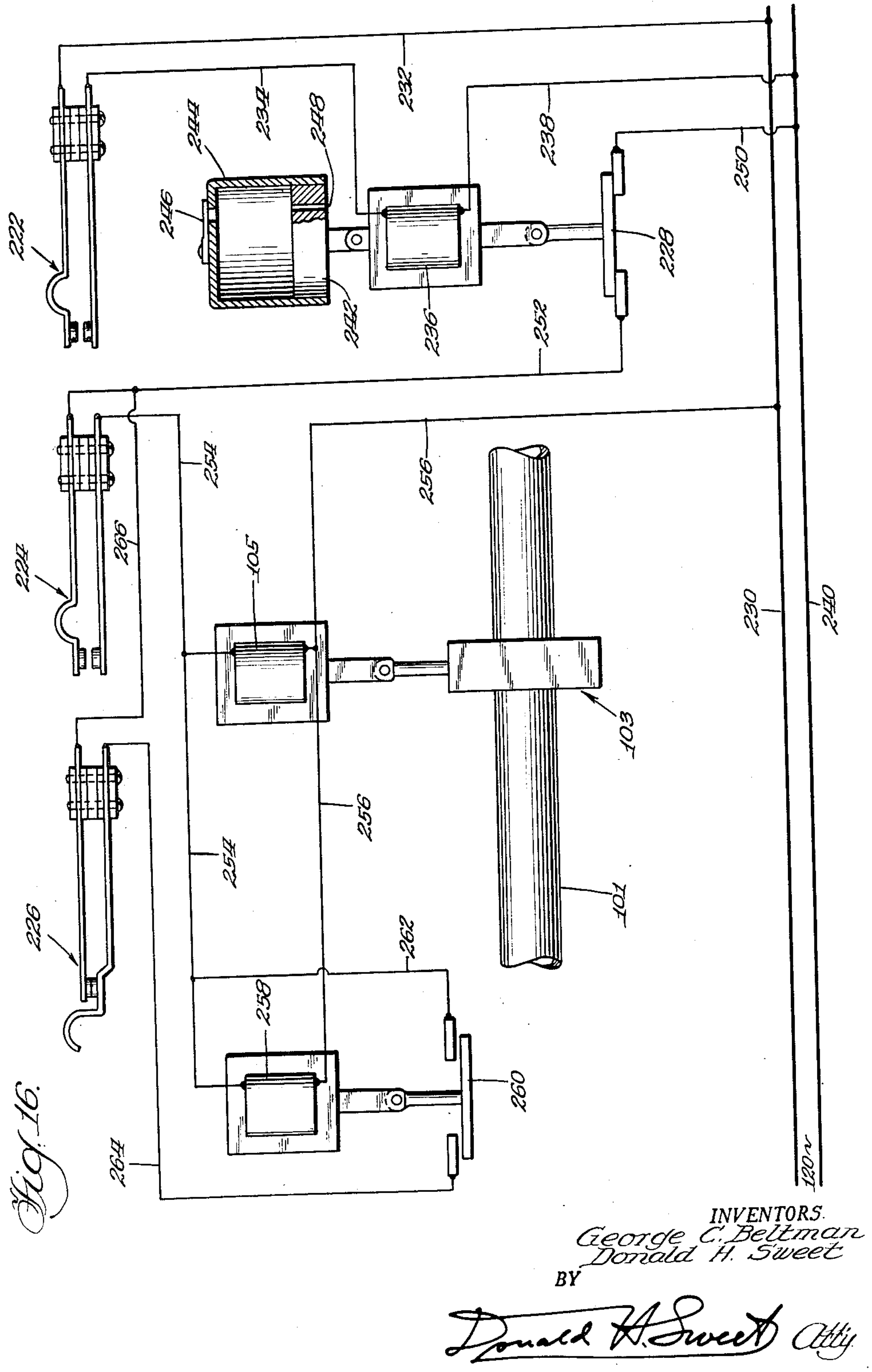
Figure 16 is a wiring diagram of the stall release.

Referring to Figure 16, we have indicated an electrical unit, including a set-up switch 222; a relief switch 224; and a reset switch 226, spaced along the track at intervals of about thirty-six inches, so that the entire unit completes its sequences with respect to each axle passing over, without any harmful overlapping from a preceding or following axle. As a wheel passes over the unit it will close the set-up switch 222 momentarily, and then close the switch 224 and then open the switch 226.

Closure of the set-up switch 222 completes a circuit for lifting the relay 228 as follows: from the upper power line 230 through conductor 232, switch 222, conductor 234, relay solenoid 236 and conductor 238 back to the lower power line 240. Solenoid 236 lifts the relay and with it the dash-pot piston 242, which rises in the pot 244 while the air in the pot escapes through check valve 246. After switch 222 opens, the relay 228 can sink back into its lower closed position as air leaks in around piston 242 and through a bleed hole 248.

If the wheel which has actuated switch 222 is going fast enough to close and open switch 224 before relay 228 gets back down to closed position, nothing more will happen. But if the wheel is below the critical running speed for which the unit is adjusted, the simultaneous closure of relay 228 and switch 224 completes two circuits.

The first circuit is from lower power line 240, through conductor 250, relay 228, conductor 252, switch 224, conductor 254, solenoid 105 (see also Figure 8), and conductor 256 back to the upper line 230. This opens the relief valve 103 in pipe 101 and the friction action stops.

The same controls for a unit according to Figure 15, merely substitute the solenoid 210 for the solenoid 105.

The second circuit is to actuate the holding solenoid 258 and its relay switch 260. The solenoid 258 is connected to conductors 254 and 256, in shunt with solenoid 105 and switch 260 closes at the time valve 130 opens. This closes a holding circuit as follows: from upper line 230 through conductor 256, solenoids 258 and 105, conductors 254 and 262, relay 260, conductor 264, normally closed switch 226, conductors 266 and 252, relay 228 and conductor 250 to lower line 240.

Solenoid 105 will, therefore, remain energized, and the friction unit inoperative until one of three things happens, first, the stalled or nearly stalled car moves on and opens switch 226; or second, a following wheel comes along and closes switch 222. Either of these happenings breaks the holding circuit and restores the parts to original condition, ready for the next sequence of operation.

With switches 222 and 224 set three feet apart, and relay 228 timed to close in three seconds, it will be apparent that any wheel passing at one foot per second or less will fail to get off switch 224 before relay 228 closes, and the friction unit will become inoperative at once.

Two sets of switches 222, 224 and 226 are arranged along the retarding device as shown in Figure 1. The first set is arranged a little past the middle of the retarding device and the second set is arranged near the exit end.

Because the retarding or braking force of the device is a function of the speed of the moving car, it is understood that any car that becomes completely stalled in the device will have moved at least far enough to bring its rear truck up to the first set of switches. Thus the automatic release mechanism is set to operate at the time the car has neared its slowest speed.

*Simple full set operation*

By positioning a continuous series of detectors according to Figure 16 throughout the length of the friction unit, it is possible to operate without the by-pass valves of Figure 5 and without any of the return valves such as valves 63, 80 and 100 of Figure 8. Under such circumstances, each incoming car sets the friction unit up to the maximum friction value, and that friction operates on the car until the car is slowed enough to operate one of the release detectors, after which the car rolls on through with no further retardation.

Others may readily adapt the invention for use under various conditions of service by employing one or more of the novel features disclosed or equivalents thereof.

As at present advised with respect to the apparent scope of our invention, we desire to claim the following subject matter:

1. In combination with a friction unit of the type embodying friction shoes adjacent a rail and means for pressing said shoes against opposite side faces of a wheel rolling along said rail between said shoes: hydraulic pressure equipment positioned in advance of said friction unit for adjusting said unit automatically to exert on a wheel moving between said shoes a friction retarding force approximately proportional to the kinetic energy of the car; said equipment including a pair of vertically movable weight-sensitive treadles positioned in alignment in both rails to carry the car wheels just before they enter said friction unit; means actuated by said treadles for generating a wave of hydraulic pressure roughly proportional to the imposed weight minus a predetermined deduction less than the weight of the lightest car to be retarded; hydraulic operating means for adjusting said friction unit to varying degrees of friction; loading means in the nature of a return spring, for subjecting said operating means to a predetermined initial load; connections between said generating and operating means for delivering pressure fluid under relatively slight retardation due to viscosity, whenever said wave pressure exceeds said predetermined initial load; by-pass means operating more slowly than said connections, for dissipating said pressure wave by timed leakage; the speed of operation of said by-pass being such that the pressure wave from a car having a predetermined minimum speed so slow that no retardation is desired, is vented through said by-pass without generating enough pressure to overcome said initial load, while cars going faster develop effective pressure waves increasing progressively in duration with the speed and in pressure with the weight of the car up to the maximum capacity of the equipment and friction unit; check valve means for retaining in said operating means the fluid forced in by said generating means; adjustable bleed means effective after the pressure wave is gone to by-pass said check valve means and permit a timed return of the equipment and unit to original position under the force of said return spring; said treadles being adjacent said friction unit, whereby the front wheels of a truck enter said friction unit before the rear wheels have left the treadles long enough to permit material return movement; automatic pressure sensitive cut-out means for rendering said bleed means inoperative so long as the wheel load on said friction unit maintains the pressure in the operating means above a predetermined value greater than said initial load; and an adjustable by-pass around said cut-out means for permitting a return movement much slower than said bleed means.

2. In combination with a friction unit of the type embodying friction shoes adjacent a rail and means for pressing said shoes against opposite side faces of a wheel rolling along said rail between said shoes: hydraulic pressure equipment positioned in advance of said friction unit for adjusting said unit automatically to exert on a wheel moving between said shoes a friction retarding force approximately proportional to the kinetic energy of the car; said equipment including a pair of vertically movable weight-sensitive treadles positioned in alignment in both rails to carry the car wheels just before they enter said friction unit; means actuated by said treadles for generating a wave of hydraulic pressure roughly proportional to the imposed weight minus a predetermined deduction less than the weight of the lightest car to be retarded; hydraulic operating means for adjusting said friction unit to varying degrees of friction; loading means for subjecting said operating means to a predetermined initial load; connections between said generating and operating means for delivering pressure fluid under relatively slight retardation due to viscosity, whenever said wave pressure exceeds said predetermined initial load; means operating more slowly than said connections, for dissipating said pressure wave by timed leakage; the speed of operation of said last mentioned dissipating means being such that the pressure wave from a car having a predetermined minimum speed so slow that no retardation is desired, is vented without generating enough pressure to overcome said initial load, while cars going faster develop effective pressure waves increasing progressively in duration with the speed and in pressure with the weight of the car up to the maximum capacity of the equipment and friction unit; check valve means for retaining in said operating means the fluid forced in by said generating means; adjustable bleed means effective after the pressure wave is gone to by-pass said check valve means and permit a timed return of the equipment and unit to original position under the force of said return spring; said treadles being adjacent said friction unit, whereby the front wheels of a truck enter said friction unit before the rear wheels have left the treadles long enough to permit material return movement; and automatic pressure sensitive cut-out means in series with said bleed means for rendering said bleed means inoperative so long as the wheel load on said friction unit maintains the pressure in the operating means above a predetermined value greater than said initial load.

3. In combination with a friction unit of the type embodying friction shoes adjacent a rail and means for pressing said shoes against opposite side faces of a wheel rolling along said rail between said shoes: hydraulic pressure equipment positioned in advance of said friction unit for adjusting said unit automatically to exert on a wheel moving between said shoes a friction retarding force approximately proportional to the kinetic energy of the car; said equipment including a pair of vertically movable weight-sensitive treadles positioned in alignment in both rails to carry the car wheels just before they enter said friction unit; means actuated by said treadles for generating a wave of hydraulic pressure roughly proportional to the imposed weight minus a predetermined deduction less than the weight of the lightest car to be retarded; hydraulic operating means for adjusting said friction unit to varying degrees of friction; loading means for subjecting said operating means to a predetermined initial load; connections between said generating and operating means for delivering pressure fluid under relatively slight retardation due to viscosity, whenever said wave pressure exceeds said predetermined initial load; means operating more slowly than said connections, for dissipating said pressure wave by timed leakage; the speed of operation of said last mentioned dissipating means being such that the pressure wave from a car having a predetermined minimum speed so slow that no retardation is desired, is vented without generating enough pressure to overcome said initial load, while cars going faster develop effective pressure waves increasing progressively in duration with the speed and in pressure with the weight of the car up to the maximum capacity of the equipment and friction unit; check valve means for retaining in said operating means the fluid forced in by said generating means; and adjustable bleed means effective after the pressure wave is gone to by-pass said check valve means and permit a timed return of the equipment and unit to original position under the force of said return spring; said treadles being adjacent said friction unit, whereby the front wheels of a truck enter said friction unit before the rear wheels have left the treadles long enough to permit material return movement.

4. In combination with a friction unit of the type embodying friction shoes adjacent a rail and means for pressing said shoes against opposite side faces of a wheel rolling along said rail between said shoes: hydraulic pressure equipment positioned in advance of said friction unit for adjusting said unit automatically to exert on a wheel moving between said shoes a friction retarding force approximately proportional to the kinetic energy of the car; said equipment including a pair of vertically movable weight-sensitive treadles positioned in alignment in both rails to carry the car wheels just before they enter said friction unit; means actuated by said treadles for generating a wave of hydraulic pressure roughly proportional to the imposed weight minus a predetermined deduction less than the weight of the lightest car to be retarded; hydraulic operating means for adjusting said friction unit to varying degrees of friction; loading means comprising a return spring, for subjecting said operating means to a predetermined initial load; connections between said generating and operating means for delivering pressure fluid under relatively slight retardation due to viscosity, whenever said wave pressure exceeds said predetermined initial load; means operating more slowly than said connections, for dissipating said pressure wave by timed leakage; the speed of operation of said last mentioned dissipating means being such that the pressure wave from a car having a predetermined minimum speed so slow that no retardation is desired, is vented without generating enough pressure to overcome said initial load, while cars going faster develop effective pressure waves increasing progressively with the speed and weight of the car up to the maximum capacity of the equipment and friction unit; check valve means for retaining in said operating means the fluid forced in by said generating means; adjustable bleed means effective after the pressure wave is gone to by-pass said check valve means and permit a timed return of the equipment and unit to original position under the force of said return spring.

5. In combination with a friction unit of the type embodying friction shoes adjacent a rail and means for pressing said shoes against opposite side faces of a wheel rolling along a rail between said shoes: hydraulic pressure equipment positioned in advance of said friction unit for adjusting said unit automatically to exert on a wheel moving between said shoes a friction retarding force approximately proportional to the kinetic energy of the car; said equipment including a pair of vertically movable weight-sensitive treadles positioned in alignment in both rails to carry the car wheels just before they enter said friction unit; means actuated by said treadles for generating a wave of hydraulic pressure of a magnitude depending on the imposed weight; hydraulic operating means for adjusting said friction unit to varying degrees of friction; connections between said generating and operating means for delivering pressure fluid to said operating means to actuate it; means operating more slowly than said connections, for dissipating said pressure wave by timed leakage; the speed of operation of said last mentioned dissipating means being such that the pressure wave from a car having a predetermined minimum speed so slow that no retardation is desired, is vented without generating enough pressure to actuate said operating means, while cars going faster develop effective pressure waves increasing progressively with the speed and weight of the car up to the maximum capacity of the equipment and friction unit.

6. Equipment according to claim 5 in combination with automatic cut-out means, responsive to the pressure generated by entry of wheels between said shoes when set to take a load, for rendering said dissipating means inoperative as long as loaded pressure is maintained.

7. Equipment according to claim 6 in combination with a second adjustable bleed means bypassing said cut-out means.

8. In combination with a friction-type car retarder: fluid-pressure adjusting means for adjusting said retarder for varying degrees of friction: yielding means tending to return said retarder to zero adjustment; automatic actuating means responsive to the speed and to the weight of an approaching car, for varying the extent of adjustment; return control means for permitting a timed return of said retarder to zero adjustment; said return control means including a timed rapidly operating return means, and a timed slowly operating return means; and automatic control connections rendered operative by a friction load in said retarder, for rendering said rapid return means inoperative as long as the load continues; said adjusting means including low-resistance means operative only in the absence of a friction load, for making large adjustments in the direction of increased friction; said adjustment means including high-resistance means operative under any friction load, for making small adjustments in the direction of increased friction; and connections actuated by contact with the approaching car wheels for rendering said adjustment means operative.

9. In combination with a friction-type car retarder; hydraulic adjusting means for adjusting said retarder for varying degrees of friction; automatic actuating means responsive to the speed and to the weight of an approaching car, for varying the extent of adjustment; return control means for causing a timed return of said retarder to zero adjustment; said return control means including a timed slowly operating return means, and a timed rapidly operating return means; and automatic control connections for permitting said rapid return means to operate only after the car to be retarded has withdrawn its rear pair of wheels from engagement with said retarder.

10. In combination with a friction-type car retarder; fluid pressure adjusting means for adjusting said retarder for varying degrees of friction; yielding means tending to return said retarder to zero adjustment; automatic actuating means responsive to the speed and to the weight of an approaching car, for varying the extent of adjustment; return control means for permitting a timed return of said retarder to zero adjustment; said return control means including a timed rapidly operating return means, and a timed slowly operating return means; and automatic control connections rendered operative by a friction load in said retarder, for rendering said rapid return means inoperative as long as the load continues.

11. In combination with a friction-type car retarder; liquid pressure adjusting means for adjusting said retarder for varying degrees of friction; yielding means tending to return said retarder to zero adjustment; automatic actuating means responsive to the speed and to the weight of an approaching car, for varying the extent of adjustment; return control means for permitting a timed return of said retarder to zero adjustment; said return control means including a timed rapidly operating return means, and a timed slowly operating return means; and automatic control connections rendered operative by a friction load in said retarder, for rendering said rapid return means inoperative as long as the load continues.

12. In combination with a friction-type car retarder; hydraulic adjusting means for adjusting said retarder for varying degrees of friction; automatic actuating means responsive to the speed and to the weight of an approaching car, for varying the extent of adjustment; means for causing a slow timed return of said retarder toward zero adjustment while there is a friction load on said retarder; and means for causing a rapid return in the absence of a friction load.

13. In combination with a friction-type car retarder; liquid pressure adjusting means for adjusting said retarder for varying degrees of friction; yielding means tending to return said retarder to zero adjustment; automatic actuating means rendered operative by an approaching car, for varying the extent of adjustment; and hydraulically timed return control means for permitting a timed return of said retarder to zero adjustment.

14. In combination with a railroad track and an adjustable friction-type car retarder positioned along said track; a high-pressure generator for delivering pressure fluid, positioned in advance of said retarder; a low-pressure generator for delivering pressure fluid, positioned in advance of said high pressure generator; connections for actuating said generators by the passing wheels of an oncoming car; yielding means normally holding said retarder adjusted to produce no friction; a pressure fluid motor for adjusting said retarder to produce varying degrees of friction; connections between said generators and motor for delivering the energy from both generators to said motor to cause said retarder to be adjusted in advance of entry of an oncoming car; said low-pressure generator being sensitive to both the weight and speed of a wheel passing it; said high-pressure generator being sensitive to the speed of a wheel passing it, but substantially insensitive to weight; said low-pressure generator delivering its output at an energy level sufficient to adjust said retarder in unloaded condition but insufficient to adjust said retarder in loaded condition; said high-pressure generator delivering its output at an energy level sufficient to increase the friction adjustment of said retarder even under load; slowly acting restoring means operative under high pressure to permit slow decrease in the friction adjustment during high-pressure operation; quickly acting restoring means operative during low-pressure operation to permit rapid decrease in the friction adjustment; and automatic pressure-sensitive means for rendering said quick acting restoring means inoperative during high-pressure operation.

15. In combination with a railroad track and an adjustable friction-type car retarder positioned along said track; a generator for delivering energy at a high energy potential; a generator for delivering energy at a low energy potential; both generators being positioned in advance of said retarder; connections for actuating said generators by the passing wheels of an oncoming car; means normally holding said retarder adjusted to produce no friction; a motor for adjusting said retarder to produce varying degrees of friction; connections between said generators and motor for delivering the energy from both generators to said motor to cause said retarder to be adjusted in advance of entry of an oncoming car; said low-energy generator being sensitive to both the weight and speed of a wheel passing it; said high-energy generator being sensitive to the speed of a wheel passing it, but substantially insensitive to weight; said low-energy generator delivering its output at an energy level sufficient to adjust said retarder in unloaded condition but insufficient to adjust said retarder in loaded condition; said high-energy generator delivering its output at an energy level sufficient to increase the friction adjustment of said retarder even under load; slowly acting restoring means operative at high energy levels to permit slow decrease in the friction adjustment during high-energy operation; quickly acting restoring means operative during low-energy operation to permit rapid decrease in the friction adjustment; and automatic means sensitive to the energy level for rendering said quick acting restoring means inoperative during high-energy operation.

16. In combination with a railroad track and an adjustable friction-type car retarder positioned along said track; a generator for delivering energy, positioned in advance of said retarder; connections for actuating said generator in response to the passing wheels of an oncoming car; means normally holding said retarder adjusted to produce no friction; a motor for adjusting said retarder to produce varying degrees of friction; connections between said generator and motor for delivering the energy from said generator to said motor to cause said retarder to be adjusted in advance of entry of an oncoming car; said generator being sensitive to both the speed and weight of a wheel passing it; and restoring means operative to permit timed gradual decrease in the friction adjustment except during periods when said motor is increasing said adjustment.

17. In combination with a railroad track and an adjustable friction-type car retarder positioned along said track; a generator for delivering energy, positioned in advance of said retarder; connections for actuating said generator in response to the passing wheels of an oncoming car; means normally holding said retarder adjusted to produce no friction; a motor for adjusting said retarder to produce varying degrees of friction; connections between said generator and motor for delivering the energy from said generator to said motor to cause said retarder to be adjusted in advance of entry of an oncoming car; and restoring means operative to permit timed gradual decrease in the friction adjustment except during periods when said motor is increasing said adjustment.

18. In combination with a friction-type car retarder and a track passing through said retarder; a cylinder beside said track in advance of said retarder; a piston in said cylinder; mechanical connections comprising a depressible treadle beside said track to be depressed by the flange of a passing wheel, for forcing said piston forward; resilient restoring means for holding said piston back except when forced forward; a by-pass for releasing fluid in front of said piston and returning it to said cylinder behind said piston; adjustable means for throttling said by-pass; said piston being large enough to support the entire weight of a passing wheel; whereby the pressure wave generated by a passing wheel depends on both the speed and the weight of said wheel; pressure fluid actuated means receiving fluid from said cylinder, for adjusting said car retarder to exert friction proportional to the pressure wave in said cylinder; quick release means comprising a by-pass from behind said cylinder to in front of said cylinder and a check valve in said by-pass for permitting said piston to return to initial position; adjustable timed control means for venting said pressure fluid actuated means to permit a timed return of said car retarder after adjustment, and operator-controlled means for venting said pressure fluid actuated means quickly, to permit immediate release of said car retarder at any time.

19. In combination with a friction-type car retarder and a track passing through said retarder; a cylinder beside said track in advance of said retarder; a piston in said cylinder; mechanical connections comprising a depressible treadle beside said track to be depressed by the flange of a passing wheel, for forcing said piston forward; resilient restoring means for holding said piston back except when forced forward; a by-pass for releasing fluid in front of said piston and returning it to said cylinder behind said piston; adjustable means for throttling said by-pass; pressure fluid actuated means receiving fluid from said cylinder, for adjusting said car retarder to exert friction proportional to the pressure wave in said cylinder; quick release means comprising a by-pass from behind said cylinder to in front of said cylinder and a check valve in said by-pass for permitting said piston to return to initial position; adjustable timed control means for venting said pressure fluid actuated means to permit a timed return of said car retarder after adjustment; and operator-controlled means for venting said pressure fluid actuated means quickly, to permit immediate release of said car retarder at any time.

20. In combination with a friction-type car retarder and a track passing through said retarder; a cylinder beside said track in advance of said retarder; a piston in said cylinder; mechanical connections actuated by the flange of a passing wheel, for forcing said piston forward; a by-pass for releasing fluid in front of said piston; adjustable means for throttling said by-pass; said piston being large enough to support the entire weight of a passing wheel; whereby the pressure wave generated by a passing wheel depends on both the speed and the weight of said wheel; and pressure fluid actuated means receiving fluid from said cylinder, for adjusting said car retarder to exert friction proportional to the pressure wave in said cylinder.

21. In combination with a friction-type car retarder and a track passing through said retarder; a cylinder beside said track in advance of said retarder; a piston in said cylinder; mechanical connections comprising a depressible treadle beside said track to be depressed by the flange of a passing wheel, for forcing said piston forward; a by-pass for releasing fluid in front of said piston; adjustable means for throttling said by-pass; and pressure fluid actuated means receiving fluid from said cylinder, for adjusting said car retarder to exert friction proportional to the pressure wave in said cylinder.

22. In combination with a friction unit of the type embodying friction shoes adjacent a rail and means for pressing said shoes against opposite side faces of a wheel rolling along a rail between said shoes: hydraulic pressure equipment for adjusting said unit automatically to exert on such wheels a friction retarding force sufficient to slow down but less than sufficient to stop the car; said equipment including a movable weight-sensitive treadle positioned to carry the car wheels; hydraulic means connected to said treadle and actuated by an imposed weight for generating a wave of hydraulic pressure; hydraulic operating means for adjusting said friction unit to varying degrees of friction; connections between said generating and operating means for delivering pressure fluid to said operating means to actuate it; restoring means normally exerting a force tending to return said friction unit and hydraulic operating means to the position of no friction, said restoring means being less powerful than said operating means; and adjustable means for varying the speed of the return to non-friction position; said means for adjusting the speed of return being an adjustable throttling valve controlling the exit of pressure fluid from said operating means.

23. In combination with a friction unit of the type embodying friction shoes adjacent a rail and means for pressing said shoes against opposite sides faces of a wheel rolling along a rail between said shoes: hydraulic pressure equipment for adjusting said unit automatically to exert on such wheels a friction retarding force sufficient to slow down but less than sufficient to stop the car; said equipment including a movable weight-sensitive treadle positioned to carry the car wheels; hydraulic means connected to said treadle and actuated by an imposed weight for generating a wave of hydraulic pressure; hydraulic operating means for adjusting said friction unit to varying degrees of friction; connections between said generating and operating means for delivering pressure fluid to said operating means to actuate it; restoring means normally exerting a force tending to return said friction unit and hydraulic operating means to the position of no friction, said restoring means being less powerful than said operating means; adjustable means for varying the speed of the return to non-friction position; and automatic means actuated by imposing a load on said friction shoes for delaying the return movement.

24. Equipment according to claim 23 in which said postponing means is a cut-out valve actuated by the hydraulic pressure generated by the load on said friction shoes, for cutting off the exit of pressure fluid from said operating means.

25. Equipment according to claim 24 in combination with an adjustable bleed by-passing said cut-out valve.

26. In a car retarding unit, in combination with a road bed and spaced parallel rails extending along said road bed, a pair of friction shoes lying substantially abreast of each other on opposite sides of one rail; said shoes being of greater length than the transverse distance between said rails; a second duplicate pair of friction shoes along the other rail; said second pair of shoes lying abreast of said first pair; a plurality of resiliently actuated mechanisms longitudinally spaced along each pair of shoes and located at a series of spaced points, for resiliently resisting separation of said shoes, whereby entry of a wheel between said shoes will expose said wheel to friction on both sides with substantially no unbalanced transverse thrust; hydraulic means positioned to receive the direct weight of a wheel rolling along said rail; connections for delivering pressure fluid from said hydraulic means; and operating means receiving said pressure fluid and actuated thereby to adjust said shoes automatically to a predetermined degree of friction, as a function of the amount of pressure fluid received, said weight-receiving means extending continuously along the path of a wheel for a predetermined distance, whereby the amount of pressure fluid is affected by the speed of the wheel, as well as by the weight; said hydraulic connections including adjustably throttled return connections offsetting the delivery to said operating means during actuation of said weight-sensitive means, whereby the net delivery of fluid increases with increased speed of the wheel.

27. In a car retarding unit of the type comprising, in combination with a road bed and spaced parallel rails extending along said road bed, a pair of friction shoes lying substantially abreast of each other on opposite sides of one rail; said shoes being of greater length than the transverse distance between said rails; a second duplicate pair of friction shoes along the other rail; said second pair of shoes lying abreast of said first pair; and means pressing said shoes against the wheels of a passing car to retard the same without unbalanced transverse thrust; automatic means positioned to be actuated by an approaching car before it engages said friction shoes, for conditioning said shoes to exert friction on the wheels of said car; a plurality of sets of automatic release means positioned at longitudinally spaced intervals to be actuated by a car while passing through said retarder; each set including a first electrical contact positioned to be actuated by each advancing car wheel; a second electrical contact positioned to be actuated by the same wheel after it has moved an additional predetermined distance interval less than the distance between successive car wheels; a timing device controlling the return of said first contact to its original condition; a control circuit dependent for operativeness on the condition of both said contacts, and arranged to become operative only in case said second contact is actuated by said wheel after said first contact has returned to its original condition; and automatic means activated by said control circuit for releasing said shoes; whereby any car wheel travelling said predetermined distance interval below a predetermined speed automatically releases said shoes.

28. In a car retarding unit of the type comprising, in combination with a road bed and spaced parallel rails extending along said road bed, a pair of friction shoes lying substantially abreast of each other on opposite sides of one rail; said shoes being of greater length than the transverse distance between said rails; a second duplicate pair of friction shoes along the other rail; said second pair of shoes lying abreast of said first pair; and means pressing said shoes against the wheels of a passing car to retard the same without unbalanced transverse thrust; a plurality of sets of automatic release means positioned at longitudinally spaced intervals to be actuated by a car while passing through said retarder; each set including a first electrical contact positioned to be actuated by each advancing car wheel; a second electrical contact positioned to be actuated by the same wheel after it has moved an additional predetermined distance interval less than the distance between successive car wheels; a timing device controlling the return of said first contact to its original condition; a control circuit dependent for operativeness on the condition of both said contacts, and arranged to become operative only in case said second contact is actuated by said wheel after said first contact has returned to its original condition; and automatic means activated by said control circuit for releasing said shoes; whereby any car wheel travelling said predetermined distance interval below a predetermined speed automatically releases said shoes.

29. In a car retarding unit of the type comprising, in combination with a road bed and spaced parallel rails extending along said road bed, a pair of friction shoes lying substantially abreast of each other on opposite sides of one rail; said shoes being of greater length than the transverse distance between said rails; a second duplicate pair of friction shoes along the other rail; said second pair of shoes lying abreast of said first pair; and means for pressing said shoes against the wheels of a passing car to retard the same without unbalanced transverse thrust; automatic release means comprising a first electrical contact positioned to be actuated by each advancing car wheel; a second electrical contact positioned to be actuated by the same wheel after it has moved an additional predetermined distance interval less than the distance between successive car wheels; a timing device controlling the return of said first contact to its original condition; a control circuit dependent for operativeness on the condition of both said contacts, and arranged to become operative only in case second contact is engaged by said wheel after said first contact has returned to its original condition; and automatic means activated by said control circuit for releasing said shoes.

30. In a car retarding unit of the type comprising, in combination with a road bed and spaced parallel rails extending along said road bed, a pair of friction shoes lying substantially abreast of each other on opposite sides of one rail; said shoes being of greater length than the transverse distance between said rails; a second duplicate pair of friction shoes along the other rail; said second pair of shoes lying abreast of said first pair; and means for pressing said shoes against the wheels of a passing car to retard the same; automatic release means positioned to be actuated by a passing car comprising a first electrical contact positioned to be actuated by an advancing car wheel; a second electrical contact positioned to be actuated by the same wheel after it has moved an additional predetermined distance interval; a timing device arranged to be started by said first contact; and connections between said timing device and said second contact for automatically reducing the action of said shoes when said first and second contacts are engaged at times differing by more than a predetermined time interval; said contacts being spaced apart by a distance less than the distance between successive wheels; whereby operation of said contacts by one wheel does not interfere with a second operation of said contacts by a succeeding wheel.

References Cited in the file of this patent

UNITED STATES PATENTS

| Number | Name | Date |
|---|---|---|
| 1,626,920 | Coleman | May 3, 1927 |
| 1,766,539 | Prescott | June 24, 1930 |
| 1,981,487 | Wherry | Nov. 20, 1934 |
| 2,104,607 | Bone | Jan. 4, 1938 |
| 2,217,214 | Brown et al. | Oct. 8, 1940 |
| 2,361,466 | Fitzsimmons | Oct. 31, 1944 |